July 23, 1935.　　　　W. ZELINGER　　　　2,009,245
ELECTRIC DEMAND LOAD CONTROL
Filed March 12, 1934
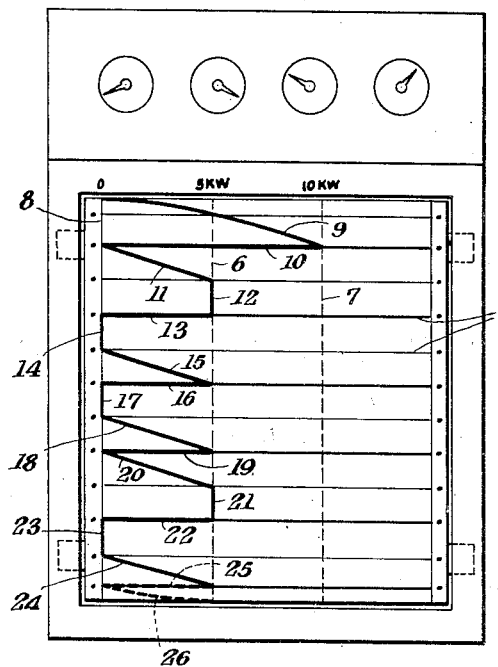
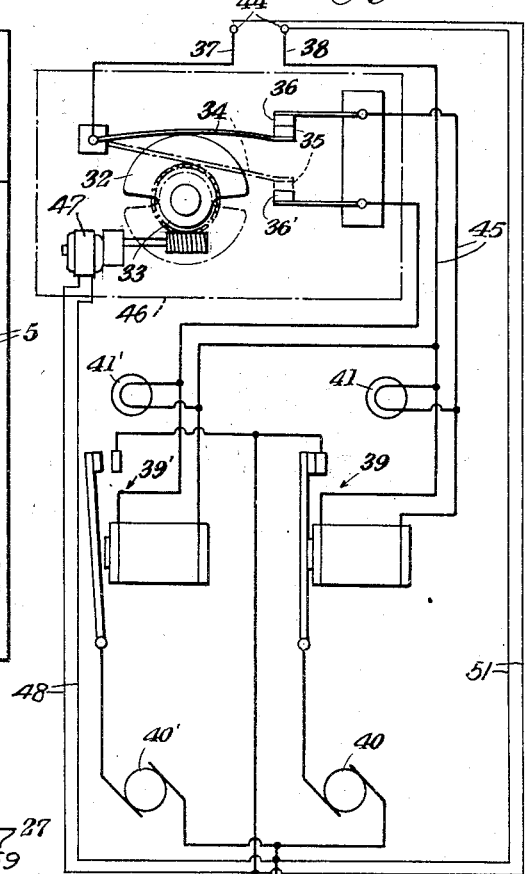
INVENTOR
WALTER ZELINGER
BY
ATTORNEY Patented July 23, 1935

2,009,245

UNITED STATES PATENT OFFICE 2,009,245

ELECTRIC DEMAND LOAD CONTROL

Walter Zelinger, Brooklyn, N. Y.

Application March 12, 1934, Serial No. 715,044

15 Claims. (Cl. 171—34)

This invention relates to the control of electric circuits and the objects of the invention are to so govern a load, where such is possible, as to gain the benefit of minimum, rather than maximum charge rates for service and to accomplish this in a simple, entirely practical way.

Maximum demand meters register the highest demands in a specified time interval, usually of 30 minutes or less. Thus with a 30 minute meter if a load of 10 kw. occurs through such a time interval, the meter will record that load if left applied for the continuous 30 minute interval. If however, such load is applied for only 15 minutes of such 30 minute period, the demand meter will then record a demand of only 5 kw., this indicating that the 10 kw. load was only applied for 15 minutes.

In the present invention, these characteristics of the maximum demand meter are utilized by timing the load so as to come on only after the maximum demand meter has reached its midpoint and this load may then be left on to the mid-point of the next interval. Thus in the supposed example, the 10 kw. load would be cut in after the demand meter had reached its midpoint or 15 minute indication and would be allowed to remain connected with the meter to the end of the 30 minute interval ending at the midpoint in the next period. Therefore, in this 30 minute interval, the load of 10 kw. has registered 5 kw. demand on the meter, since it was only applied during the second half of the first registering interval and only 5 kw. demand will show on the succeeding first half of the next 30 minute interval. Thus, by timing the load to come on at the half point of one interval and to continue only to the half point of the next interval, the demand registration is kept at a minimum, even though the service is fully utilized. For some kinds of loads, such as pumps for filling water tanks and the like, it is entirely feasible to operate in this way, in effect "staggering" the load with respect to the beginning and ending of the time intervals of the demand meter.

Further features of the invention will be understood by reference to the accompanying drawing forming part of this specification and illustrating a typical embodiment of the invention.

Fig. 1 in the drawing is a diagrammatic illustration of a maximum demand meter showing a record produced according to ordinary methods and also as resulting from practice of the present invention.

Fig. 2 is a diagram or plotting of the recording illustrated in Fig. 1.

Fig. 3 is a diagrammatic representation of the timing mechanism and other features for carrying out the invention.

The demand meter illustrated is of the curve drawing type, where an ink line drawn on a paper chart shows by the length of its stroke the kw. demand recorded in each half hour interval. In this type, the timing mechanism returns the pen to zero at the end of each timing interval, say the 30 minute period, here considered by way of illustration.

The chart will be seen to be made up of horizontal lines 5, denoting between them 15 minute periods. The left hand vertical line 6, represents the 5 kw. point on the chart and the right hand broken line 7, represents the 10 kw. point. The zero line to which the pen is returned at the end of each 30 minute interval is indicated at 8.

Considering a specific example, if beginning at the zero point a 10 kw. load is applied for a continuous half hour, the pen line 9, will be drawn extending to the 10 kw. line at the end of a 30 minute interval, whereupon the pen line will be drawn at 10, dropping back to the zero point. If a 10 kw. load be now applied for only the first 15 minute portion of the next half hour period, the pen will draw the line 11, extending only to the 5 kw. point on the chart. Then, if the 10 kw. load is cut off at this time, leaving no load on the meter for the second half or last 15 minute interval of this half hour period, the line will continue straight along the 5 kw. line as at 12 and then drop abruptly at 13, back to zero at the end of that total half hour period. Assuming now that no load is applied for the first 15 minute interval of the next half hour period, the pen line will continue straight along the zero representation as at 14. Then if a 10 kw. load is applied for the last half of this 30 minute interval, the line will be drawn as at 15, up to the 5 kw. point and at the end of such half hour drop back abruptly at 16, to zero.

Thus it will be evident that a 10 kw. load allowed to remain connected for a complete half hour corresponding to the commencement and ending of the half hour periods of the demand meter will record a 10 kw. demand and that if the same kw. load is applied for only the first or the second half of a 30 minute interval of the meter, the demand registration will be only 5 kw.

This effect on the chart will be seen by continuing the example where the zero line 17 shows that no load has been applied through the first 15 minute interval of the half hour period following the last above described.

By the automatic control of this invention, it may be supposed that the 10 kw. load is cut in at the end of the first 15 minute interval and continued through the second half, to the end of the half hour period. This will produce the demand line 18, extending from zero to only the 5 kw. point. The load is now left connected on through the first half of the next 30 minute interval. The pen drops back on the line 19 to zero and then, with the load remaining on through the first 15 minutes of the next half hour starts from zero but reaches only the 5 kw. point as indicated at 20, at the 15 minute interval of the half hour meter period, at which time the load is automatically disconnected. A 10 kw. load has accordingly been applied for a continuous half hour, but as represented by lines 18, 19, 20, the 5 kw. demand only has been recorded.

The load is now disconnected for the second half of the 30 minute period and consequently the recording simply continues along the 5 kw. line at 21. At the end of this half hour, the pen drops back at 22, to zero and with the load still disconnected during the first half of the next period, a zero line is drawn at 23. The next application of the controlled load is then made at the end of the first 15 minute interval, which for the end of the period will produce the 5 kw. marking 24, whereupon the recording will automatically drop back to zero as at 25, and with the control load still connected, continue as at 26, to the 5 kw. point, at which time at the end of a full half hour, the load will be again automatically disconnected.

The method of automatic control described thus enables the full load being applied for a continuous half hour, with a succeeding half hour shut down and the recording of a 5 kw. demand instead of the 10 kw. indication resulting from use of the load through the normal time intervals of the demand meter.

Fig. 2 is intended to represent the above effects in more elemental form. In this view, the lines 27, 28, 29, 30, 31, represent the half hour registering periods of the meter with the mid-length cross lines representing the 15 minute intervals.

Referring to line 27, Fig. 2, if the 10 kw. load is applied at the beginning of the half hour period and kept on throughout that period, 5 kw. will be registered for the first half and 5 kw. for the second half or the usual total of 10 kw. for the full meter period. If the 10 kw. load were applied at the mid-point as in accordance with this invention, only 5 kw. will be registered as appears at the right on the line 28. If then this same load be allowed to remain connected until the mid-point represented on line 29, there will be a demand registered on the first half of this second period of only 5 kw. The load has then been applied for a continuous half hour from mid-point of line 28 to mid-point of line 29, with the registration of only 5 kw. Following this, the controlled load is allowed to remain disconnected for the next continuous half hour, that is, from the mid-point of line 29 to the mid-point of line 30, when it is again applied for a continuous half hour providing the readings 5 kw. for the second half of line 30 and 5 kw. for the first half of line 31, again recording the demand of 5 kw. in one meter period.

The actual control may be effected by mechanism such as indicated diagrammatically in Fig. 3. This involves a timing device represented by a cam driven by suitable clock mechanism, operated for instance, by either a spring motor or synchronous electric motor. This cam is shown as having high and low points 32, 33, operating on a movable switch arm 34, to close and open contacts 35, 36, in a control circuit represented by lines 37, 38, the movable switch arm being included in line 37, and control or indicating devices being connected in on the other side of the circuit.

In the illustration, the actual control mechanism includes a magnetic switch at 39, for closing and opening the circuit through the load represented by motor 40, and a pilot lamp or indicator 41, for showing the load and no load periods.

The wiring circuits are illustrated diagrammatically and are self-explanatory, the current source being indicated at 42, brought through the demand meter and extended at 43, to the motor or other load 40, under control of magnetic switch 39. The control circuit may be suitably connected in on the supply mains, the terminals of this control circuit being merely represented at 44, and the supply lines to the signal or switch control mechanism being generally represented at 45.

The timing cam it will be understood, is constructed and operated to close the control circuit at 35, 36, to cut in the load at the mid-point of one demand meter period, as for example, at the second half of the line 28, Fig. 2, to hold such circuit closed until the mid-point is reached of the next succeeding half hour interval as represented on the line 29, Fig. 2, thereby holding the load connected for a continuous half hour, from the mid-point of one interval through to the mid-point of the succeeding interval, at the end of which time, the cam will have turned to the broken line position, permitting contacts 35, 36, to be separated to break the control circuit and hence disconnect the load. The load then remains disconnected for a half hour and is then cut in on the mid-point of the succeeding half hour interval, as above described.

The pilot light or visual indicator 41, is intended to show when loading applications may be controlled by hand, enabling an operator to cut in loads and to keep them on only during those "staggered" half hour intervals when the minimum registration will be made.

The magnetic control switch on the other hand provides automatic connection and disconnection of the load at the proper periods for most economical demand registration.

While only one indicator and one magnetic control switch has been indicated on the diagram, it will be appreciated that as many of these and other forms of controls or indicators may be used as found necessary or desirable.

While the preceding description supposes an absolute disconnection of the controlled load for half the time, it is possible that the shut-down periods also may be utilized where there is another and separate distinct load, for example, another 10 kw. load as represented by motor 40', cut in by engagement of movable switch contact with contact 36', opposite contact 36 and designed to be engaged following breaking of the first control circuit and maintained so engaged, during the half hour period represented by the low part of the cam. This second load would thus be switched in for the second half of a previously idle half period and maintained on through the previously idle half period of the next interval, resulting in a registration such as shown as (5 kw.) on the second half on line 29, Fig. 2 and (5 kw.) on the first half of line 30. The two loads would thus be applied alternately, utilizing first one half hour for one load and the succeeding half hour for the other load, but producing in the illustration a maximum demand registration of only 10 kw. instead of the 20 kw., which would be recorded if the two 10 kw. loads were kept continuously applied.

The figures given are merely by way of example. Thus the period of the demand meter instead of being 30 minutes may be 15 minutes, 5 minutes or other time intervals. The timing cam is designed and operated accordingly.

There need be no physical or electrical connection between the demand meter and control system. It only being necessary that the timing device be set and maintained in synchronous operating relation to the demand meter. The timing device thus may be set at the instant the demand meter returns to zero, after which the two will continue in synchronism.

While the curve drawing demand meter has been shown for purposes of illustration, it will be evident that the automatic load control may be used with other types of demand meters. While in the illustration the controlled load is described as cut in at the end of the first half of the meter period and cut out at the end of the succeeding half period, it should be understood that the invention contemplates also the planned use of less than the full half periods as described. Such a lesser time load or loads may be carried along at the same time as the full half periods. Thus for example, a main load such as a heavy duty pump might be automatically cut in for the full half period and during this time, with the pilot or pilots indicating the minimum rating period, other loads, such as machine tools and the like, might be cut in by hand and cut off either automatically or by hand before the pilot shows the end of the minimum rating period.

The timing device may be other than the cam mechanism illustrated, for example, a standard form of time switch might be used for this purpose. Other changes and modifications may be made, within the broad scope of the invention, as will be clear in the following claims.

By way of describing the action of a conventional type of demand meter to which is applied the foregoing method of connecting and disconnecting electrical loads, it is sufficient to explain that in such a demand meter, the number of disc revolutions of a watt-hour element governs the travel of the element actuating the pointer of a dial calibrated to indicate the average kilowatt load passing through the watt-hour element in a specified period of time. The demand indicator dial is calibrated in kilowatts by reason of the fact that its pointer is reset at definite intervals, so that the reading of the demand indicator is actually a measure of the kwh. used in a certain time and, since the time interval is definitely fixed, the reading of the demand indicator is considered an indication of the average kilowatt load during the demand interval. Such a meter would have the conventional kilowatt-hour register recording the total kilowatt-hours consumed and in addition would have the kilowatt demand dial. In some cases, where the kilowatt-hour register and demand dials are not self-contained in one meter it is conventional practice to operate a separate demand indicator at a remote point from the kilowatt-hour meter by means of demand meter actuating contacts in the kilowatt-hour meter to properly register the average kilowatt load passing through the watt-hour meter in a specified time period.

The contacts of the timing device are operated in synchronism with the time interval of the demand meter and it is pointed out for clarification that the demand meter time interval is in turn governed by the reset mechanism of the demand meter and therefore the contacts of the timing device referred to in the foregoing specification are also operated in synchronism with the demand meter reset mechanism.

What is claimed is:

1. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, which comprises applying the load during only the second half of one time interval of the demand meter and during only the first half of the succeeding time interval of the demand meter.

2. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, comprising applying the load during the second half of one time interval of a demand meter through into the first half of the succeeding time interval of the demand meter, discontinuing the load through the second half of said second time interval and on through the first half of the next succeeding time interval and then applying the load during the second half of said last mentioned time interval on through the first half of the succeeding time interval and again discontinuing the load at the end of said first half of said succeeding time interval.

3. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, which comprises applying the load at the mid-point of one time interval of the demand meter and continuing it through to the mid-point of the next succeeding demand time interval, discontinuing the load from the mid-point of said succeeding demand time interval on to the mid-point of the next demand time interval and then applying a load at the mid-point of said next demand time interval and continuing the load on to the mid-point of the following demand time interval.

4. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, which comprises applying the load during only the first half of a demand meter interval and disconnecting the load before the second half of the same demand meter interval.

5. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, which comprises applying the load during only the second half of a time interval of the demand meter.

6. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, which comprises applying the load during only one half of a time interval of the demand meter.

7. The herein disclosed method of applying electrical loads to a circuit securing its current supply through a time interval type of demand meter in which the mechanism for indicating the demand registration is reset periodically to measure definite time intervals on which the demand registration is based, which comprises applying one load only during the first half of one demand meter interval and applying a different load only during the second half of the same demand meter interval.

8. The herein disclosed method of applying electrical loads to a circuit securing its current supply through a time interval type of demand meter in which the mechanism for indicating the demand registration is reset periodically to measure definite time intervals on which the demand registration is based, which comprises alternately applying different loads, one load from the second half of one time interval through into the first half of a succeeding time interval and a different load from the second half of said succeeding time interval through into the first half of the next time interval.

9. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, which comprises visually indicating the duration of those halves of the time intervals of the demand meter in which a load may be cut in on the demand meter at reduced demand registration and whereby by observation of such visual indications, electric loads may be cut in on the demand meter only during those times of reduced demand registration.

10. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, which comprises applying a load on the meter only in that time embraced between the mid-point of one time interval and the mid-point of a succeeding time interval.

11. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, which comprises cutting the load off the meter at the mid-point of one time interval of the meter and then maintaining such load disconnected from the meter from said mid-point to at least the remainder of said same time interval of the meter.

12. The herein disclosed method of applying electrical loads to a circuit securing its current supply through a time interval type of demand meter in which the mechanism for indicating the demand registration is reset periodically to measure definite time intervals on which the demand registration is based, to effect reduced demand registration, which comprises applying a load to the demand meter only during the first or during the second half of a demand interval of the meter or a continuing load through from the second half of one demand interval on into the first half of the succeeding demand interval of the meter and visually indicating such periods of applied loads to thereby afford visual guidance for application of other loads during such periods of reduced demand registration.

13. Apparatus for effecting reduced demand registration, comprising in combination with a demand meter of the periodic time interval type in which the mechanism for indicating the demand registration is reset periodically to measure definite time intervals on which the demand registration is based, a load control switch and a timing switch operating in synchronism with the reset mechanism of the demand meter to cause said load control switch to cut in and maintain the load on the demand meter only in a period embraced between the mid-point of one demand interval of the meter and the mid-point of the succeeding demand interval of the meter.

14. Apparatus for effecting reduced demand registration, comprising in combination with a demand meter of the periodic time interval type in which the mechanism for indicating the demand registration is reset periodically to measure definite time intervals on which the demand registration is based, a load control switch and a timing switch operating in synchronism with the reset mechanism of the demand meter to cause said load control switch to cut in and maintain the load on the demand meter only in a period embraced between the mid-point of one demand interval of the meter and the mid-point of the succeeding demand interval of the meter and an indicator controlled by said time switch to show the duration of said on and off control periods.

15. Apparatus of the character disclosed, comprising in combination, a demand meter of the periodic time interval type in which the mechanism for indicating the demand registration is reset periodically to measure definite time intervals on which the demand registration is based, a timing switch synchronized with said reset mechanism of the demand meter and load controlling switch mechanism controlled by said synchronized timing switch for applying a load to the demand meter only in the intervals embraced between the mid-point of one demand interval and the mid-point of the succeeding demand interval of the demand meter.

WALTER ZELINGER.

Certificate of Correction

Patent No. 2,009,245.

July 23, 1935.

WALTER ZELINGER

It is hereby certified that error appears in the printed specification of the above numbered patent requiring correction as follows: After the heading to the printed specification beginning with line 1, first column, page 1, strike out all printed matter to the end of line 48, first column, page 3, and insert instead:

This invention relates to the control of electric circuits receiving current through a maximum demand meter and a particular object of the invention is to apply electric loads in such circuits so that they will register upon the demand meter an amount of kilowatt demand below that which would have been registered had the electric loads been applied without regard to the demand meter time interval. It is thus an aim of the invention to make it possible to gain the benefit of a minimum, rather than maximum demand charge rate for service and further objects are to accomplish this in a simple, entirely practical way.

Maximum demand meters register the highest kilowatt demands in a specified time interval, usually of 30 minutes. Some demand meters have time intervals other than 30 minutes, but for the purpose of describing this invention it will be assumed that the time interval of the demand meter is 30 minutes. With a 30 minute meter, if a load of 10 kw. is applied for the entire time interval, the demand meter will record a demand of 10 kw. If, however, such load is applied for only 15 minutes of a 30 minute period, the demand meter will then record a demand of only 5 kw.

In the present invention, these characteristics of the maximum demand meter are utilized, in one instance, by timing the application of the load so that the load will be applied when the time interval of the demand meter has reached its mid point. This load may then be left applied to the mid point of the next time interval. In the supposed example, the 10 kw. load is applied when the time interval of the demand meter has reached its mid point and allowed to remain applied until the demand meter has reached the mid point of the next time interval. Therefore, in the 30 minute period just described, the load of 10 kw. has registered only 5 kw. demand on the meter, since the load was left applied during the second half of the first time interval, thereby registering 5 kw. demand and upon allowing this load to remain applied for the first half of the next time interval, a demand of only 5 kw. again will be registered. Thus, by timing the load to come on at the mid point of one interval and to continue only to the mid point of the next interval, the demand registration as given in the example for a 10 kw. load applied for a continuous half hour, would be only 5 kw., as compared with a registration of 10 kw. if that load had been applied in the conventional manner from the beginning to the end of a demand interval. Therefore the demand registration is a minimum, even though the load is applied for a continuous half hour and though utilizing the full service of the demand interval. For some kinds of loads, such as pumping operations, electric heating and other loads which would permit their intermittent operation, it is entirely feasible to operate in such manner to secure the benefit of minimum demand registration.

Further features of the invention will be understood by reference to the accompanying drawing forming part of this specification and illustrating a typical embodiment of the invention.

Fig. 1 in the drawing is a diagrammatic illustration of a maximum demand meter showing the record produced according to ordinary methods of applying electric loads and also record resulting from practice of the present invention.

Fig. 2 is a diagram or plotting of the recording illustrated in Fig. 1.

Fig. 3 is a diagrammatic representation of the timing mechanism and other features for carrying out the purpose of the invention.

The demand meter illustrated is of the curve drawing type, where an ink line drawn on a paper chart shows by the length of its stroke the kw. demand recorded in each 30 minute interval. In this type, the timing mechanism returns the pen to zero at the end of each timing interval, say the 30 minute period, here considered by way of illustration.

The chart will be seen to be made up of horizontal lines 5, denoting between them 15 minute periods. The left hand vertical broken line 6, represents the 5 kw. point on the chart and the right hand broken line 7, represents the 10 kw. point. The zero line to which the pen is returned at the end of each 30 minute interval is indicated at 8.

Considering a specific example, if beginning at the zero point a 10 kw. load is applied for a continuous half hour, the pen line 9, will be drawn extending to the 10 kw. line at the end of a 30 minute interval, whereupon the pen line will be drawn at 10, dropping back to the zero point. If a 10 kw. load be now applied for only the first 15 minute portion of the next half hour period, the pen will draw the line 11, extending only to the 5 kw. point on the chart. Then if the 10 kw. load is cut off at this time, leaving no load on the meter for the second half or last 15 minute interval of this half hour period, the line will be continued straight along the 5 kw. line as at 12 and then dropped abruptly at 13, back to zero at the end of that total half hour period. Assuming now that no load is applied for the first 15 minute interval of the next half hour period, the pen line will continue straight along the zero representation as at 14. Then if a 10 kw. load is applied for the last half of this 30 minute interval, the line will be drawn as at 15, up to the 5 kw. point and at the end of such half hour drop back abruptly at 16, to zero.

Thus it will be evident that a 10 kw. load, allowed to remain connected for a complete half hour corresponding to the commencement and ending of the half hour interval of the demand meter, will record a 10 kw. demand and that if the same 10 kw. load were applied for only the first or the second half of a 30 minute interval of the meter, the demand registration will be only 5 kw.

This effect on the chart will be seen by continuing the example where the zero line 17 shows that no load has been applied through the first 15 minute interval of the half hour period following the last above described.

By the automatic control of this invention, it may be supposed that the 10 kw. load is cut in at the end of the first 15 minute interval and continued through the second half to the end of the half hour period. This will produce the demand line 18, extending from zero to only the 5 kw. point. The load is now left connected on through the first half of the next 30 minute interval. The pen drops back on the line 19 to zero and then, with the load remaining on through the first 15 minutes of the next half hour starts from zero, but reaches only the 5 kw. point as indicated at 20, at the 15 minute point of this half hour meter interval, at which time the load is automatically disconnected. A 10 kw. load has accordingly been applied for a continuous half hour, but as represented by lines 18, 19, 20, the 5 kw. demand only has been recorded.

The load is now disconnected for the second half of the last mentioned 30 minute demand interval and consequently the recording simply continues along the 5 kw. line as at 21. At the end of this half hour, the pen drops back at 22 to zero and with the load still disconnected during the first half of the next demand interval, a zero line is drawn at 23. The next application of the controlled load is then made at the 15 minute point of the following demand interval, which, at the end of the interval, will produce the 5 kw. marking 24, whereupon the recording will automatically drop back to zero as at 25, and with the controlled load still connected, continue as at 26 to the 5 kw. point, at which time, at the end of a full half hour, the load will be again automatically disconnected.

The method of automatic control described thus, enables the full load being applied for a continuous half hour, with a succeeding half hour shut down and the recording of a 5 kw. demand instead of the 10 kw. indication resulting from use of the load through the normal time intervals of the demand meter.

Fig. 2 is intended to represent the above effects in more elemental form. In this view, the lines 27, 28, 29, 30, 31, represent the half hour registering periods of the demand meter with the mid-length cross lines representing the 15 minute points of the demand intervals.

Referring to line 27, Fig. 2, if the 10 kw. load is applied at the beginning of the half hour period and kept on throughout that period, 5 kw. will be registered for the first half and 5 kw. for the second half, or the usual total of 10 kw. for the full meter period. If the 10 kw. load were applied at the mid point as in accordance with this invention and left applied to the end of the demand period, only 5 kw. will be registered as appears at the right half of line 28. If then this same load be allowed to remain connected until the mid point represented on line 29, there will be a demand registered on the first half of period 29 of only 5 kw. The load has therefore been applied for a continuous half hour from mid point of line 28, to mid point of line 29, with the registration of only 5 kw. for a continuous half hour use of a 10 kw. load applied to a 30 minute demand interval meter. Following this, the controlled load is allowed to remain disconnected for the next continuous half hour, that is, from the mid point of line 29 to the mid point of line 30, when it is again applied for a continuous half hour to record a demand of 5 kw. in the half hour period from the mid point of line 30 to the mid point of line 31, in which the 10 kw. load has again been applied for a continuous half hour.

To control the application of loads on an electric circuit taking current through a time interval demand meter, any standard or specially manufactured timing device, may be used, such for example, as illustrated in Fig. 3 at 46. This timing device may be constructed to open and close a control circuit through which the actual loads to be controlled are applied by means of automatic magnetic switch or hand control switch. Such timing device, when used to control loads on alternating current circuits, may be driven by a synchronous motor as illustrated at 47, Fig. 3, deriving its current through wiring 48 from a common source of alternating current supplied by service lines 42. The timing device is thus operated at the same electrical frequency as the synchronous motor 49, driving the demand meter interval timing mechanism, which is connected with the same source of supply 42 through wiring 50. When using the method of load control described in this invention on direct current circuits, the driving element of the timing device 46 may be an accurately timed spring driven clock, in which case the demand meter interval timing element could also be driven by a spring clock.

In Fig. 3, showing timing device 46, the mechanism illustrated is for descriptive purposes only, since such mechanism would vary in timing devices of different manufacture. Therefore the following description of the control circuit contact opening and closing characteristics of timing device 46 is to be considered as illustrative. The cam shown in timing device 46 has high and low points 32, 33, operating upon a movable switch arm 34, to close and open contacts at 35, 36 in a control circuit represented by lines 37, 38, the movable switch arm being included in line 37 and control or indicating devices being connected in on the other side of the circuit.

In the illustration, the actual load connecting mechanism is a magnetic switch 39, for closing and opening the load circuit represented by motor 40. A pilot lamp or indicator 41, is provided to show the time periods in which the load may be applied at a minimum demand meter registration. This pilot lamp or indicator is intended as an aid for hand control of individual loads or the simultaneous operation of hand and automatically controlled loads.

The wiring circuits are illustrated diagrammatically and are self-explanatory, the current source being indicated at 42, brought through the demand meter and extended at 43, to the motor or other load 40, which in turn is under control of magnetic switch 39. The control circuit may be suitably connected to the supply mains, the terminals of this control circuit being represented at 44, connected with the supply source by wiring 51, and the supply lines to the signal or switch control mechanism being generally represented at 45.

The timing cam illustrated, it will be understood, is constructed and operated to close the control circuit at 35, 36, to cut in the load at the mid point of one demand meter interval, as for example, at the mid point of the line 28, Fig. 2, and to hold such circuit closed until the demand meter timing mechanism has reached the mid point of the next succeeding demand meter time interval as represented at the mid point of line 29, Fig. 2, thereby holding the load connected for a continuous half hour, at the end of which time the cam will have turned to the broken line position, permitting contacts 35, 36, to be separated to break the control circuit and hence disconnect the load. The load then remains disconnected for a half hour, during which time the cam has revolved to its upward or full line position to again close contacts 35, 36, to again cut in the load at the mid point of the next succeeding half hour interval as above described.

While only one indicator and one magnetic control switch has been illustrated on the diagram, it will be appreciated that as many of these and other forms of controls or indicators may be used as found necessary or desirable.

While the preceding description supposes an absolute disconnection of the controlled load for half the time, it is possible that the shut-down periods also may be utilized where there is another and separate distinct load that it may be desired to use during the previously described shut-down periods, as for example, another 10 kw. load as represented by motor 40', Fig. 3, which may be cut in by engagement of movable switch contact 35 with contact 36' opposite contact 36 and designed to be engaged following breaking of the first control circuit and maintained so engaged during the half hour period represented by the low part of the cam. This second load would thus be switched in during the otherwise idle half hour period at the mid point of line 29, Fig. 2 and allowed to be connected up to the mid point of line 30. During this previously idle half hour period the demand as registered by the demand meter would be (5 kw.) from the mid point of line 29 to the end of line 29 and (5 kw.) from the beginning of line 30 to the mid point of line 30. The two loads would thus be applied alternately, utilizing first one half hour for one load and the succeeding half hour for the other load, but producing as illustrated in Fig. 2 lines 29, 30, a maximum demand registration of only 10 kw. instead of 20 kw., which would be recorded if the two 10 kw. loads were kept continuously applied.

The demand meter interval of 30 minutes used throughout the past description is merely by way of example. Thus the interval of the demand meter instead of being 30 minutes may be 15 minutes, 5 minutes or other time intervals. The control circuit timing device 46 would be designed to operate accordingly so as to accommodate the demand meter time interval with which it would operate.

There need be no physical or electrical connection between the demand meter and control system, except that the synchronous motor driving the control circuit timing mechanism takes its current supply from the same source of electrical frequency supplied to the driving motor of the demand meter interval timing mechanism on alternating current circuits, while on direct current circuits this would not exist, due to both the control circuit timing mechanism and the demand meter interval timing mechanism being driven by separate spring clocks. In practice, it would only be necessary for control circuit timing device 46 to be set and maintained in synchronous operating relation to the demand meter interval timing mechanism. The timing device 46 may thus be set at the instant the demand meter timing interval is at zero, after which timing device 46 and the demand meter interval timing mechanism will continue to operate in synchronism.

While the curve drawing type of demand meter has been shown for purposes of illustration, it will be evident that the electric demand load control may be used with other types of demand meters, such as the indicating type.

While in the illustration the controlled load is described as being cut in at the mid point of one demand meter time interval and left applied until the mid point of the next succeeding demand meter time interval, it should be understood that the invention contemplates also the planned application of loads where the loads are left applied for a period of time less than the value of the demand meter time interval. As for example in the case of a 30 minute demand interval meter, a 10 kw. load may be applied at the 22½ minute point as illustrated at 53, line 28, in Fig. 2. This 10 kw. load would then be left applied until the 7½ minute point of the next demand meter interval has been reached, as illustrated in line 29 at 54. Thus a 10 kw. load has been applied from the 22½ minute point of line 28 to the 7½ minute point of line 29, covering a total elapsed time of 15 minutes. Under this condition of load application, a 10 kw. load will record on the demand meter 2½ kw. for the 15 minutes elapsed, as compared with a demand registration of 5 kw. had the 10 kw. load been applied in the conventional manner, with its elapsed time of 15 minutes falling wholly within any one demand meter interval. As a matter of further illustration, a 10 kw. load could be applied at the 26.25 minute point of line 28 as at 55 and left continuously applied until reaching the 3.75 minute point of line 29 as at 56. Thus the 10 kw. load has been applied continuously for 7.5 minutes from 55 line 28 to 56 line 29 and will record a demand on the demand meter of 1.25 kw. as compared with a demand meter registration of 2.5 kw. had this 10 kw. load been applied continuously in the conventional manner, so that the elapsed time of 7½ minutes would have fallen wholly within any one demand meter interval. Loads left applied as just described for lesser elapsed time than the demand meter time interval, may be applied simultaneously with loads which are applied for an elapsed time equal to the demand meter time interval. Thus for example, while a load such as a pump may be applied from the mid point of one demand meter time interval to the mid point of the next succeeding demand interval, one or more separate and distinct loads whose elapsed operating time is less than the demand meter time interval, may be applied simultaneously with the pump or other loads whose elapsed time is equal to the demand meter interval. In such case the pump load would be applied at 61 line 28 Fig. 2 and disconnected at 63 line 29, thereby utilizing an elapsed time of 30 minutes. Simultaneously with the pump load another load may be applied at 53 line 28 and taken off at 54 line 29, with an elapsed time for this load of 15 minutes. Simultaneously with the pump and other load just described, a third load may be applied from 55 line 28 to 56 line 29, in which the elapsed operating time is 7½ minutes. In each of these examples of load operations, the demand which will be recorded on the demand meter through application of these loads in accordance with this invention, will be one-half the kw. value that would have been recorded had these loads been applied in the conventional manner, so that their elapsed operating time would have fallen wholly within any one demand meter time interval.

In addition to the methods of applying loads as previously described, it is also contemplated to apply loads either separately or simultaneously with those already described, as for example a load of 10 kw. may be applied at 57 line 27 Fig. 2 and disconnected at 58 line 27, whereby the elapsed operating time is 15 minutes and recording 5 kw. demand. From 58 line 27 to 59 line 27, such load would be disconnected and again applied at 60 line 28 and left applied until reaching the mid point of line 28 at 61, when this load would be again left disconnected from 61 to 62 line 28. Thus this 10 kw. load has been applied for the first half of each demand meter time interval and left disconnected for the second half of each demand meter time interval. Such load operation would record on the demand meter 5 kw. demand for a 10 kw. load. Conversely, it is also possible to apply loads during the second half only of each demand meter time interval, as for example a 10 kw. load applied at 58 line 27 Fig. 2 and left applied until 59 line 27, in which the elapsed operating time is 15 minutes would record a demand of 5 kw. This load is then left disconnected from 60 to 61 line 28, representing the first 15 minutes of the next demand interval, whereupon the load is again applied at 61 to 62 line 28, representing the last half of time interval 28.

A summary of the contemplated utilization of the characteristics of a time interval demand meter in applying load or loads in accordance with the disclosure of this invention is as follows:

Applying one or more loads from the mid point of one demand meter time interval to the mid point of the next succeeding demand meter time interval.

Applying one or more loads at any point falling between the mid point of one demand meter time interval and the end of this same interval and leaving such load applied up to any point falling between the beginning of the next succeeding demand meter time interval and the mid point of this same time interval.

Applying one or more loads for the first half only of each demand meter time interval.

Applying one or more loads for the last half only of each demand meter time interval.

Applying one or more loads controlled from a second control circuit and timed by the previously described timing device so as to operate such other loads during the unused portions of the demand meter time intervals left unused by the loads operated from the main or previously described control circuit. The application of such other loads operated from the second control circuit is intended to be exactly the same as the application of loads from the first control circuit previously described, thereby permitting the full use of the entire demand meter time interval alternately for some loads controlled from the mid point of a demand meter time interval to the mid point of the second demand meter time interval or any portion thereof, controlled from the first control circuit and then through the operation of control circuit timing device, the alternate load is applied from the mid point of the second demand meter time interval to the mid point of the third demand meter time interval or any portion thereof, whereupon the control circuit timing device operates to again cut in the original load or loads.

It should be understood that while Fig. 3 illustrating timing device 46 is described as timing loads to be applied from the mid point of one demand meter time interval to the mid point of the next succeeding time interval, such description is illustrative only. Since this invention contemplates the application of loads for other time periods as described, timing device 46 would necessarily be constructed to apply loads under the method and elapsed time interval desired as covered by previous load application descriptions.

And that the said Letters Patent should be read with this correction therein that the same may conform to the record of the case in the Patent Office.

Signed and sealed this 25th day of February, A. D. 1936.

[SEAL]

LESLIE FRAZER,
*Acting Commissioner of Patents.*